Jan. 29, 1963 F. STUMP 3,075,704
THERMOSTATIC VALVE
Filed Sept. 22, 1960 4 Sheets-Sheet 1

INVENTOR.
FRED STUMP
BY
RICHEY, McNENNY & FARRINGTON
Ronald W. Farrington
ATTORNEYS Jan. 29, 1963  F. STUMP  3,075,704
THERMOSTATIC VALVE
Filed Sept. 22, 1960  4 Sheets-Sheet 3

INVENTOR.
FRED STUMP
BY
RICHEY, McNENNY & FARRINGTON
Donald W. Farrington
ATTORNEYS United States Patent Office 3,075,704
Patented Jan. 29, 1963

3,075,704
THERMOSTATIC VALVE
Fred Stump, Conneaut, Ohio, assignor to White Sewing Machine Corporation, Lakewood, Ohio, a corporation of Delaware
Filed Sept. 22, 1960, Ser. No. 57,752
16 Claims. (Cl. 236—66)

This invention relates generally to thermostatic valves and more particularly to improvements in such valves adapted for use as either air vent or drain valves for steam systems.

Air vent valves for steam systems are intended to remain open when steam is first admitted into a system to be pressurized to permit air to be driven out, and then to close and prevent the escape of steam. Drain valves are intended to remain closed during operation of a steam or water system at normal temperatures, preventing escape of either steam or water, and to open and drain all condensate or water from the system to prevent damage from freezing in the event the temperature drops to a predetermined point.

Heretofore thermostatic air vent valves have been subject to excessive leakage of steam, and thermostatic drain valves have been subject to clogging and failure to open sufficiently to allow free drainage and prevent damage from freezing.

The present invention provides a novel valve and thermostatic operator which seals tightly against leakage at all temperatures above a predetermined temperature, and opens rapidly and widely when the temperature drops below such predetermined temperature. A tight seal is maintained even at small temperature differences above the closing temperature, and whenever the temperature falls sufficiently to initiate opening movement, the valve moves quickly to its wide open position, so that any accumulated sediment is flushed out, thereby preventing clogging. In this way the defects of the prior valves are eliminated.

A principal feature of this invention is combining a valve closure member biased toward its seat and freely movable so as to be self-aligning with the seat, and a thermostatic operator mounted to be self-aligning with the closure member so as to apply only straight axial opening forces on the closure.

Another feature of this invention is the provision of a novel thermostatic valve in which the valve closing element is a round ball which on closing is released by a bimetal member to seat under the forces of both its own weight and the pressure within the valve, and which is opened by the bimetal member which engages the ball to positively lift it out of engagement with the valve seat with increasing mechanical advantage against the closing bias.

Another feature of this invention is the provision of a bimetal member in the form of a strip mounted in such a manner that the flexing of the strip responsive to a change in temperature causes a ball contacting portion of the strip to move both radially and axially with respect to the ball and thereby provide a maximum amount of movement to the ball with a minimum amount of movement by the bimetal strip.

Still another feature of this invention is the provision of a novel thermostatic drain or vent valve which is compact in size and simplified in construction to allow low cost production without sacrifice of reliability and performance.

In preferred embodiments of the present invention, a valve closing and sealing member is provided in the form of a round ball which when the valve is open is held within a cage directly above the valve seat. A bimetal strip is mounted on the cage and extends downwardly adjacent the valve seat where it is provided with a hook or claw ball engaging portion formed in such a manner that when the valve is above the closing temperature, the bi-metal strip bends away from the valve seat to allow the ball to seat under the force of gravity and fluid pressure against the valve seat. When the ball is seated, the bimetal strip is shifted out of engagement with the ball which is unrestrained so that it is self-aligning on the valve seat. When the temperature of the bimetal strip drops below the closing temperature, the bimetal strip is bent toward the ball and the valve seat so that the ball engaging portion contacts the surface of the ball below its center and adjacent to the valve seat to apply a force having an upward component tending to lift the ball off of the seat. The ball is biased toward the valve seat by its own weight and by the force of the fluid pressure within the valve, and when the force applied by the bimetal strip is sufficient to overcome these seating forces, the ball is lifted off the seat. Since the initial lifting of the ball off its seat releases the fluid pressure seating force on the ball, and provides an increasing mechanical advantage, the ball is then lifted upward away from the valve seat with a snap action to insure instant and positive complete opening of the valve.

Additional objects and features of this invention will readily become apparent upon a more complete understanding of the invention, several embodiments of which are shown in the accompanying drawings and described in detail in the following description.

Figure 1:
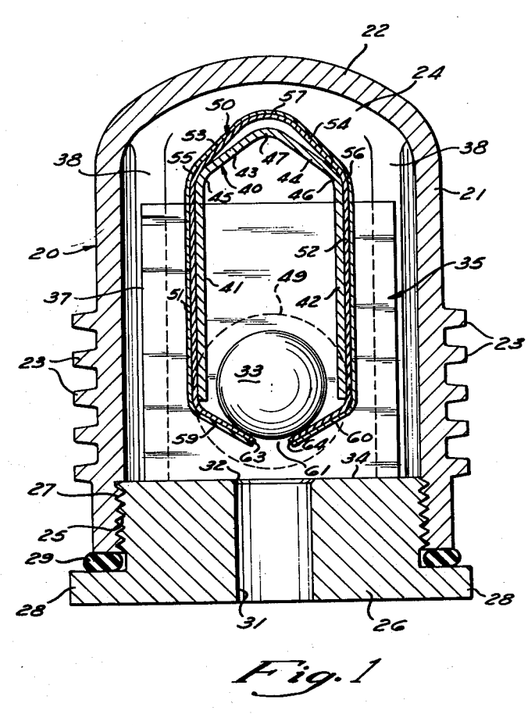
FIG. 1 is a vertical cross-sectional view of an air vent valve according to the present invention showing the valve in the open position.
Figure 2:
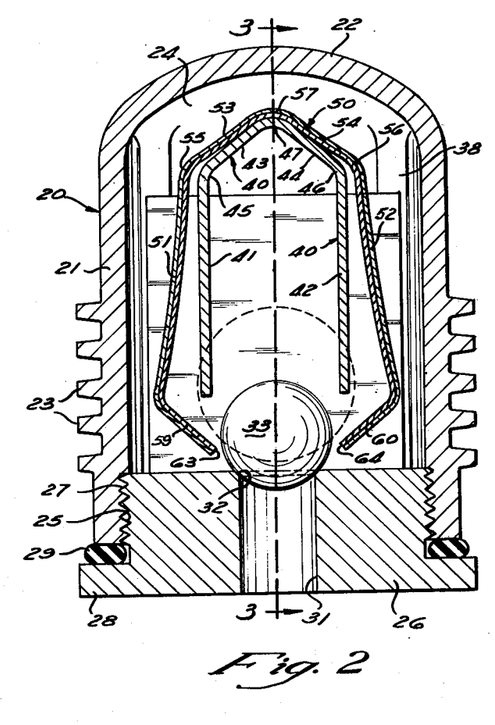
FIG. 2 is a vertical cross-sectional view similar to FIG. 1, but showing the valve in the closed position.
Figure 3:
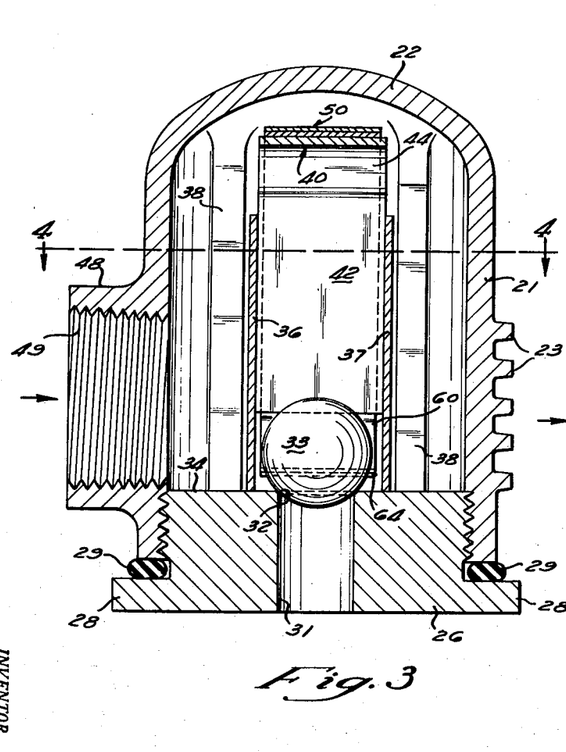
FIG. 3 is a vertical cross-sectional view of the valve taken on line 3—3 of FIG. 2.
Figure 4:
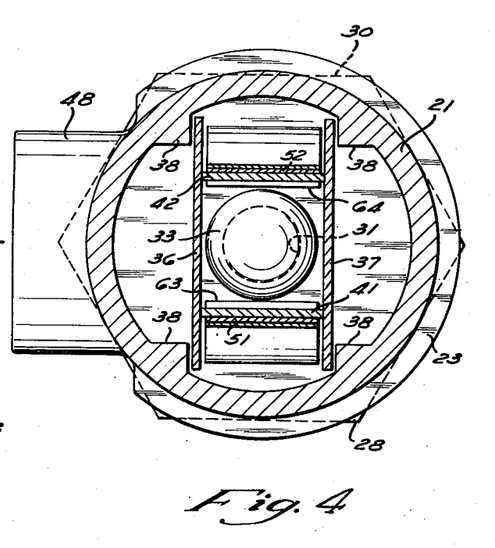
FIG. 4 is a horizontal cross-sectional view of the valve taken on line 4—4 of FIG. 3.

Referring to the figures in greater detail, FIGS. 1–4 show an air vent valve embodying the present invention. This valve is adapted for use as an air vent valve for a steam system and is normally open as shown in FIG. 1 at low temperatures to allow the escape of air from within the system. When the system becomes filled with steam after the air has been driven out through the valve, the steam enters the valve which in response to the high temperature of the steam then closes as shown in FIG. 2.

The valve includes a body 20 having substantially cylindrical side walls 21 and a domed top wall 22. A plurality of circumferential ribs 23 project outwardly from the side wall 21 and serve to increase the effective area for dissipating heat to allow the valve to cool off rapidly. The valve mechanism is contained within a hollow chamber 24 within valve body 20, and chamber 24 is closed off at its lower end by means of a plug 26 having a threaded portion 27 adapted to engage internal threads 25 in the lower end of chamber 24. Thus the valve body 20 and plug 26 form a valve housing enclosing the valve mechanism in chamber 24. At its lower end, plug 26 has a radially extending flange 28 which presses a gasket 29 against the lower end of the valve body side walls 21 to make a sealing contact therebetween. The flange 28 is provided with wrench receiving flats 30 so that the plug may be easily unscrewed and removed from the valve body. Plug 26 has a centrally located vertical bore 31 which at its upper end adjacent the upper surface 34 of plug 26 is provided with a chamfer 32 forming a valve seat. A valve closing member in the form of ball 33 somewhat larger in diameter than bore 31 is adapted to fit against the valve seat 32 when the valve is closed to seal off bore 31 and prevent the escape of fluid within chamber 24 out through bore 31.

The ball 33 is positioned within the valve by means of a cage 35 which also serves as the support for the bi-metal strip which raises and lowers the ball to open and close the valve. Cage 35 includes a pair of flat, rectangular side plates 36 and 37 which rest edgewise on the upper surface 34 of plug 26 and are spaced apart and maintained in parallel relationship by means of a retainer 40 to which the side plates 36 and 37 are secured by suitable fastening means such as brazing or welding. The cage 35 is held in position within chamber 24 in a fixed orientation and prevented from rotating by means of four vertical ribs 38 which extend along the vertical length of the side wall 21 and project inwardly therefrom. As shown more clearly in FIGS. 3 and 4, the cage 35 is positioned so that the one side plate 36 extends transversely across the inlet opening 49 which extends through a projecting boss 48 on the one side of the valve body 20. Cage 35 is positioned in this manner so that the fluid entering chamber 24 is diverted by the cage side plate 36 to flow upwardly over the top of the cage and down through the space between the side plates 36 and 37 to reach the outlet bore 31. Thus the incoming fluid is required to circulate throughout substantially all of chamber 24 so that the valve is uniformly heated, and the flow downwardly between the side plates 36 and 37 insures the most rapid heating of the bimetal strip as will be explained in greater detail hereinafter.

The retainer 40 is formed from a single strip of metal to have an inverted U shape. Thus the retainer has sides 41 and 42 which extend vertically parallel to each other and which are secured to the side plates 36 and 37. The retainer sides 41 and 42 extend downward to terminate a spaced distance above the upper surface 34 of plug 26 when the cage is in position within the valve. Above the sides 41 and 42, the retainer has top portions 43 and 44 which slope upwardly and inwardly to form an included angle which, in the illustrated embodiment, is approximately 90°. The top portions 43 and 44 join the sides 41 and 42 at rounded corners 45 and 46, respectively, and in turn, the top portions 43 and 44 meet each other at a rounded peak portion 47.

The bimetal strip is indicated at 50 and is formed to extend over the outer surface of retainer 40. The bimetal strip 50 has sides 51 and 52 which lie adjacent the sides 41 and 42 of the retainer. In similar fashion, the bimetal strip has sloping top portions 53 and 54 which join the sides 51 and 52 at the corners 55 and 56, respectively, and these top portions 53 and 54 meet each other at a rounded peak 57, forming an included angle less than that between the retainer portions 43 and 44, so that when the valve is open with the sides 51 and 52 of the bimetal strip in abutting contact with the sides 41 and 42 of the retainer, the rounded peak 57 of the bi-metal strip is spaced a distance above the rounded peak 47 on the retainer. In this position, the vertical load of the bi-metal strip 50 is carried by the corners 55 and 56 resting on the rounded corners 45 and 46 of the retainer.

Directly below the sides 51 and 52, the bimetal strip 50 has ball-engaging hook portions 59 and 60 which slope downwardly and inwardly immediately below the lower ends of the retainer sides 41 and 42. These hook portions 59 and 60 are spaced apart at their lower ends, 63 and 64, respectively, by a gap indicated at 61, and, in the form shown, the angle between the portions 59 and 60 is approximately 120°.

The bimetal strip 50 is formed from any of the suitable bimetal materials which comprise two thin sheets of metal having dissimilar coefficients of thermal expansion which are bonded together throughout their entire length. Bimetal strip 50 is formed so that the metal having the higher coefficient of thermal expansion is on the inside adjacent the retainer 40 so that as the bimetal strip is heated, the different rates of thermal expansion tend to cause the strip to straighten itself out so that the hook portions 59 and 60 move farther apart from each other thereby increasing the gap 61 between them.

At low temperatures, when the valve is in the open position as shown in FIG. 1, the bimetal strip 50 is closed together so that its sides 51 and 52 lie in abutting contact with the sides 41 and 42, respectively, of retainer 40. The ball 33 is then lifted well above the valve seat 32 and is supported on the hook portions 59 and 60 of the bimetal strip. When the valve is heated, as by the introduction of steam into its interior, the heating of the bimetal strip 50 tends to cause it to deflect toward the position of FIG. 2. It will be seen that the sides 51 and 52 are bent outwardly so that the hook portions 59 and 60 are spread apart to allow the ball 33 to drop onto the valve seat 32 and close the valve. The heating also causes the top portions 53 and 54 of the bimetal strip to spread apart and increase the included angle between them so that it equals or exceeds the included angle between the top portions 43 and 44 of the retainer. Thus when the valve is closed the rounded peak 57 of the bimetal strip has moved downwardly into contact with the rounded peak 47 on the retainer, thereby causing the entire bimetal strip to be shifted downward.

When the temperature within the valve is reduced to a point where the valve is to reopen, the lowering of the temperature of the bimetal strip 51 causes the hook portions 59 and 60 to move together and come into engagement with the ball 33 in position on the valve seat 32. The ends 63 and 64 of the hook portions 59 and 60, respectively, contact the ball a short distance below its center so as to exert an upward force on the ball tending to lift it off the valve seat. Since the ball is maintained in position in engagement with the valve seat 32 both by its weight and the force of the fluid pressure within the chamber 24, the ball will not be lifted off its seat at once, but will remain seated as the force exerted by the ends 63 and 64 of the hook portions 59 and 60 increases as the cooling bimetal strip tends to return to the position of FIG. 1, until the upward component of this force is sufficient to lift the ball off the seat. Once the ball has been initially lifted off the seat, the force of the fluid pressure within the valve tending to keep the ball seated is reduced and the ball is lifted at once up into the space within the retainer 40 and the hook portions 59 and 60 move together until they have returned to the position of FIG. 1.

Likewise, as the hook portions 59 and 60 move together after the ball has started to rise, the mechanical advantage of their force against the closing bias increases as the points of engagement shift further from the center of the ball, insuring the snap-action opening even if the fluid pressure is low. As the bimetal strip closes with the hook portions 59 and 60 moving closer together, the included angle between the top portions 53 and 54 decreases so that it is less than the included angle between the retainer top portions 43 and 44, and the rounded peak 57 of the bimetal strip 50 is lifted off the rounded peak 47 of retainer 40. This movement imparts an upward movement to the entire bimetal strip 50 and causes the hook portions 59 and 60 to shift upwardly thus raising the ball 33 to a higher position within retainer 40 and creating a greater free space between the lower portion of hook portions 59 and 60 and the valve seat 32 to allow increased clearance space for fluid flow out through bore 31.

It will also be noted that the position of the cage 35 within valve chamber 24 insures circulation of the fluid flowing inwardly through the inlet opening 49 and outwardly through bore 31 passing over the bimetal strip 50 to insure even and thorough heating of the entire strip so that all portions of this strip will be at the temperature of the fluid flowing through the valve. The fluid entering through the inlet opening 49 impinges upon the one side plate 36 of cage 35 and is deflected upwardly to pass over the top of the side plate. Since the only path to the outlet bore 31 is between the side plates 36 and 37, the fluid flowing out through bore 31 necessarily passes the bimetal strip 50 which extends over the outer surface of retainer 40. Thus the fluid can flow on the outside of bimetal strip 50 to pass between the side plates 36 and 37, the sides 51 and 52 of the bimetal strip, and the side walls 21 of the valve body. In addition, the fluid can pass through the opening formed between the top portions 43 and 44 of the retainer which extend above the upper edge of side plate 36 and then downward through the space between the retainer sides 41 and 42. Since the ball 33 is a relatively loose fit between the side plates 36 and 37 and between the retainer sides 41 and 42, the fluid can flow past the ball 33 and outwardly through the gap 61 between the hook portions 59 and 60. It will also be noted that the bimetal strip 50 is slightly narrower than the space between the side plates 36 and 37 so that during expansion and contraction the strip will not bind against the side plates 36 and 37. This gap between the bimetal strip 50 and the side plates 36 and 37 aids the flow around the hook portions 59 and 60 so that the fluid passing outwardly from the space between the retainer sides 41 and 42 can flow between the edges of hook portions 59 and 60 and the side plates 36 and 37.

Figure 5:
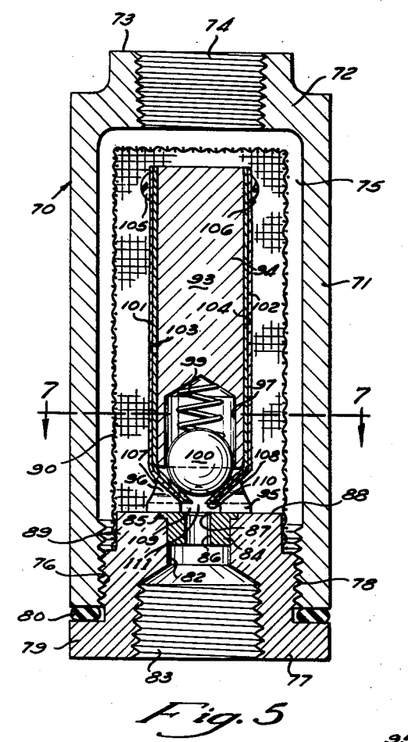
FIG. 5 is a vertical cross-sectional view of another embodiment of the invention for use as a fluid drain valve, showing the valve in the open position.
Figure 6:
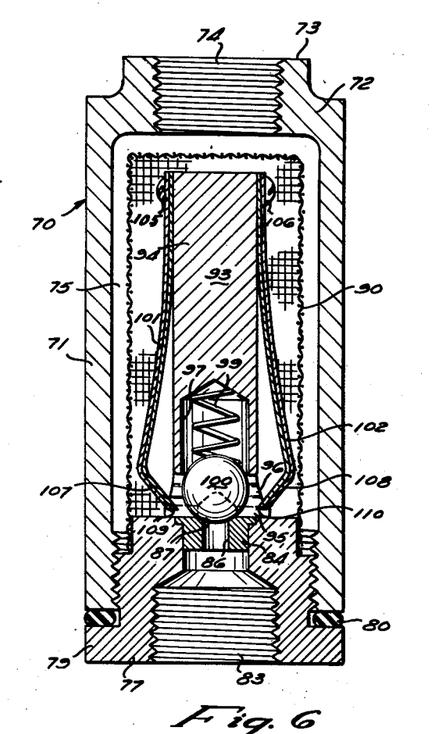
FIG. 6 is a vertical cross-sectional view similar to FIG. 5, but showing the valve in the closed position.
Figure 7:
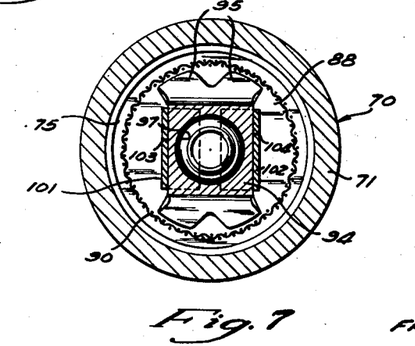
FIG. 7 is a horizontal cross-sectional view of the valve taken on line 7—7 of FIG. 5.

Another embodiment of the invention for use as a liquid drain valve is shown in FIGS. 5 through 7. The valve has a valve body 70 having side walls 71 enclosing a substantially cylindrical chamber 75. At its upper end, chamber 75 is closed off by the top 72 of the valve body. Top 72 is provided with a projecting boss 73 having a threaded inlet opening 74 for connection with a pipe fitting to admit the fluid into the chamber 75. At the lower end of chamber 75, the side walls 71 are formed with internal threads 76 to receive a threaded portion 78 of a plug 77 which closes off the lower end of chamber 75. Plug 77 at its lower end has a radially extending flange 79 which is adapted to compress a sealing gasket 80 against the lower end of the side walls 71 to prevent fluid leakage from between the plug 77 and valve body 70. An axial bore 82 extends downwards through plug 77 to open into an enlarged threaded counterbore 83 suitable for receiving an outlet pipe fitting. A valve seat insert 84 is fitted within bore 82 and is provided at its upper end with a radially extending flange 85 to prevent the insert from being forced downwardly through bore 82. Valve seat insert 84 is provided with a reduced axial bore 86, which at its upper end, adjacent the top surface 88 defined by the plug 77 and insert 84, is provided with a conical chamfer 87 which serves as a valve seat. The upper end of plug 77 has a reduced shank 89 about which is fitted a screen 90. Screen 90 extends in tubular fashion upward adjacent the top 72 of the valve body where it is closed off across the top. Screen 90 serves as a filter or strainer to prevent any solid particles which enter through the inlet opening 74 from settling around the valve seat 87 and clogging the valve.

A cage 93 is positioned within chamber 75 and within the screen 90 to contain the valve operating mechanism. Cage 93 has an elongated upstanding shank portion 94 which is supported on a plurality of legs 95 which extend outwardly and are spaced around the valve seat insert 84 to support the cage on the top surface 88 of the insert and the plug 77. Legs 95 are interspaced by openings 96 to allow fluid to reach the valve seat 87. An axially extending bore 97 is located in the lower end of shank portion 94 of the cage to contain a ball 100 which is adapted to engage the valve seat 87 and close the valve. A relatively light compression spring 99 is positioned within bore 97 above ball 100 to counterbalance and bias the ball 100 toward valve seat 87 and insure positive closing actuation of the valve regardless of its position.

A pair of bimetal strips 101 and 102 are positioned on opposing sides 103 and 104, respectively, of the cage shank 94. These strips 101 and 102 are secured to the cage shank 94 at their upper ends by means of screws 105 and 106 and extend downwardly along sides 103 and 104 to the lower end of shank portion 94. At their lower ends, the strips 101 and 102 are provided with bent hook portions 107 and 108, respectively, which extend downwardly and inwardly so that their respective ends, 109 and 110, are separated by a small gap 111. The hook portions 107 and 108 have an included angle of approximately 120° and serve to control the position of the ball 100 to open and close the valve.

In operation, the valve behaves in a manner similar to the valve shown in FIGS. 1–4. The valve, as shown in FIG. 5, is normally closed at low temperatures to allow the low temperature liquid entering the valve through the inlet 74 to pass outward through the outlet opening 83. The bimetal strips 101 and 102 are formed with the material having the higher coefficient of thermal expansion on the inside adjacent the cage shank 94. As these strips are heated by the incoming liquid, they bend away from the shank so that the ends 109 and 110 of the hook portions spread apart to allow the ball 100 which has been held within bore 97 when the valve is open to move downwardly under the action of spring 99 to seat against valve seat 87 and close the valve.

The valve closes when the temperature of the liquid within the valve chamber 75 is reduced to a point where the bimetal strips 101 and 102 are bent inwardly so that the ends 109 and 110 of the hook portions 107 and 108 engage the surface of the ball 100 below its center. When the force supplied by the bimetal strips 101 and 102 is sufficient to overcome the seating force on the ball resulting from the bias of spring 99 and the pressure exerted by a liquid within the valve, the ball moves upward off valve seat 87. Since the downward force due to the fluid pressure is then released, and the mechanical advantage of the hook portions 107 and 108 is increased, the ball immediately snaps upward as the hook portions 107 and 108 move together to retract the ball 100 upwards into bore 97 to full opened position. The relatively free passage through the openings 96 permits a full rapid flow of the liquid which flushes out any sediment that may have collected in the vicinity of the valve.

Figure 8:
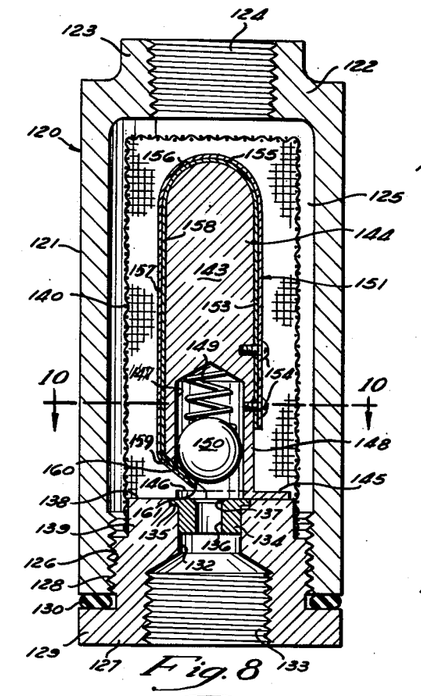
FIG. 8 is a vertical cross-sectional view of another embodiment of the fluid drain valve showing the valve in the open position.
Figure 9:
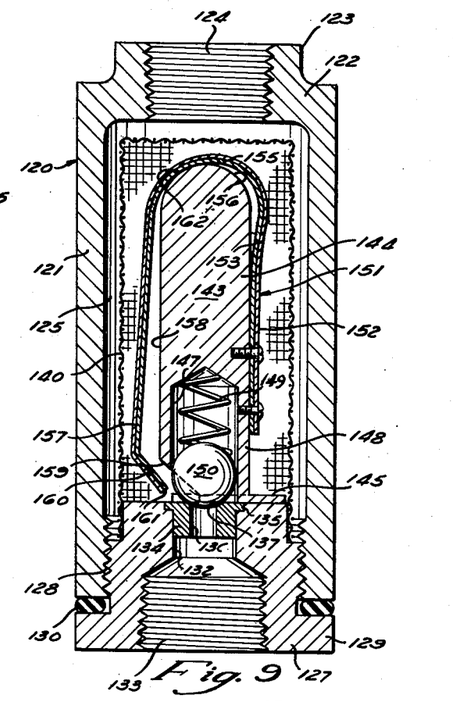
FIG. 9 is a vertical cross-sectional view of the drain valve of FIG. 8 showing the valve in the closed position.
Figure 10:
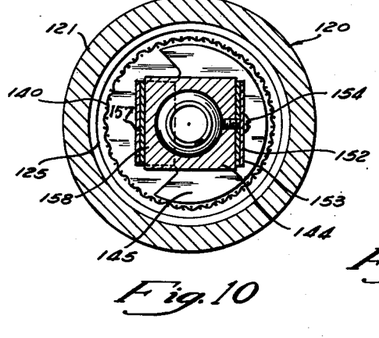
FIG. 10 is a horizontal cross-sectional view taken on line 10—10 of FIG. 8.

Another embodiment of the drain valve is shown in FIGS. 8 through 10. The valve shown therein has a valve body 120 similar to valve body 70 of the embodiment shown in FIGS. 5 through 7, so that valve body 120 encloses a chamber 125 formed by side walls 121 and the top 122 which is provided with a boss 123 having a threaded inlet opening 124 extending therethrough. At its lower end, valve body 120 has internal threads 126 receiving threads 128 on plug 127. Plug 127 at its lower end has a radially extending flange 129 adapted to compress a sealing gasket 130 against the lower edge of the side walls 121 to prevent leakage of fluid out of the valve. Plug 127 is provided with an axially extending bore 132 which at its lower end connects with an enlarged threaded counterbore 133 which serves as the valve outlet. A valve seat insert 134 is positioned within bore 132 and has at its upper end a radially extending flange 135 to secure the insert in place. The valve seat insert 134 is provided with a reduced axial bore 136 terminating at its upper end in a conical valve seat 137. Plug 127 is provided with a reduced shank 139 to support a screen 140 to prevent the collection of sludge and particles around the valve seat.

The valve actuating mechanism is contained within a cage 143 contained within chamber 125 and screen 140. Cage 143 comprises a shank portion 144 having at its lower end a radially extending flange 145 which makes abutting contact with the top surface 138 formed by the plug 127 and the valve seat insert 134. Flange 145 serves to position the cage upright within the valve chamber 125, and to provide access for fluid to the valve seat 137, the cage has a cutout indicated at 146.

Directly above valve seat 137, the cage shank 144 is provided with an axially extending bore 147 having a wall 148 which extends downward opposite cutout 146 to the top surface 138. A ball 150 adapted to make sealing contact with valve seat 137 is positioned within bore 147 and is biased downwardly by means of a light compression spring 149 within bore 147 above the ball 150.

A bimetal strip 151 is formed to have a generally inverted U shape, having one side 152 of the strip extending downwardly along the side 153 of shank portion 144 opposite cutout 146, where the strip is secured in place by means of screws 154. From screws 154 the strip extends upwardly to a radius bend 155 which fits over the rounded top 156 on shank portion 144. The bimetal strip 151 then continues downward to have a relatively straight portion 157 extending along the side 158 of shank portion 144 adjacent the cutout 146. At its lower end, bimetal strip 151 is provided with a hook portion 160 sloping downwardly and inwardly and adapted, when the valve is open, to make abutting contact on the sloping upper surface 159 of cutout 146. It will be seen as indicated in FIG. 8, that hook portion 160 extends inwardly to retain the ball 150 within the bore 147 when the valve is open.

When the fluid within the valve chamber 125 heats the bimetal strip 151, the strip, which has the metal having the higher coefficient of thermal expansion on the inside adjacent the cage shank 144, tends to deflect to swing the hook portion 160 radially outward until the end 161 is free of the bore 147 to allow the ball 150 to move downwardly under the action of the biasing force of spring 149 to seat against the valve seat 137 and close the valve. Since the bimetal strip 151 is uniformly heated by the liquid within the valve chamber, it will tend to deflect evenly at all points. Thus not only does the leg 157 above the hook portion 160 flex outwardly, but in addition, the radius bend 155 also opens to spread the legs 153 and 157 relative to each other. Furthermore, the other side 152 deflects away at its upper end from the cage shank and tends to draw the radius bend portion 155 of the bimetal strip across the rounded top 156 of the cage shank, and by virtue of the leverage exerted by the rounded top 156 as a fulcrum, the one leg 157 is bent outward about the tangential point of contact indicated at 162 in FIG. 9.

It will be seen that by virtue of the shape of the bimetal strip 151, this embodiment allows the use of a relatively long bimetal strip in a relatively small and compact space so that the end 161 on hook 160 is able to move between the open and closed positions of the valve with a relatively small range of temperature change. Thus this embodiment is particularly adapted to applications where it is desired that the opening temperature and closing temperatures be relatively close together with only a small temperature differential between them.

When the temperature of the liquid within the valve chamber 125 drops to a point where the hook portion 160 on the bimetal strip is bent backwards toward the open position, the end 161 engages the ball 150 below its center, and by virtue of the force applied at this point, the ball either rolls or slides up the bore wall 148 until it is lifted to the open position of FIG. 8. It will be understood that the force of biasing spring 149 is relatively light compared to the force exerted by the bimetal strip 151 so that the spring 149 offers comparatively little resistance to the opening of the valve.

It will be understood that when the valve is closed, that one of the forces maintaining the ball in contact with the seat is the pressure of the fluid within the valve. Accordingly, when the valve is exposed to very high internal pressures, the bimetal strip must exert a correspondingly greater force upon the ball to lift it off the seat in order to break the sealing force created by this internal pressure. Although the use of a thicker bimetal strip would increase the opening force initially applied to the ball, the thickening of the strip decreases the amount the strip flexes per unit change in temperature. However, this greater force is necessary only for the initial unseating of the ball, since this initial movement of the ball not only reduces the pressure sealing force on the ball but allows the hook portions to engage the ball at a lower point to give increased mechanical advantage.

Figure 11:
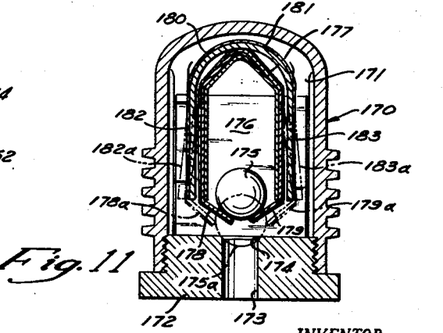
FIG. 11 is a vertical cross-sectional view of a modification of the valve of FIGS. 1–4 for use with a high pressure system.

A modification of the valve for use at higher system pressure is shown in FIG. 11 in which an additional bimetal member is employed to exert an additional opening force on the ball. As shown therein, the valve includes a valve body 170 enclosing a chamber 171 which is closed at its lower end by a threaded plug 172. Plug 172 is provided with a bore 173 and a valve seat 174 adapted to receive a ball 175. Ball 175 is positioned within a cage 176 which supports a bimetal strip 177. It will be understood that the aforedescribed construction of FIG. 11 is substantially the same as that disclosed in the embodiment of FIGS. 1 through 4.

A second bimetal strip 180 is provided to fit over the bimetal strip 177 and provide additional closing force to the hook portions 178 and 179. The second bimetal strip 180 has a radius bend 181 at its upper end from which extend a pair of legs 182 and 183 which reach downward adjacent the hook portions, 178 and 179 respectively, on the bimetal strip 177. Bimetal strip 180 rests loosely on top of bimetal strip 177, and when the valve is open, the legs 182 and 183 are spaced away from the hook portions 178 and 179 on bimetal strip 177. This second bimetal strip 180 is preferably formed from heavier stock than bimetal strip 177, so that it may exert a proportionately greater force for lifting the ball 175.

In operation, the second bimetal strip 180 during the closing of the valve expands so that the legs 182 and 183 move apart to the positions indicated in dotted lines at 182a and 183a to allow the hook portions 178 and 179 on the first bimetal strip 177 to spread apart to the positions shown at 178a and 179a and let the ball 175 move downward as shown at 175a to seat on valve seat 174 and close the valve. Since the second bimetal strip 180 is thicker than bimetal strip 177, the legs 182 and 183 will not spread apart as fast as hook portions 178 and 179 and the latter will then be in contact with legs 182 and 183 only when the valve is fully closed as shown in the dotted line positions. When the temperature of the bimetal strips drops, the hook portions 178 and 179 move toward each other to engage the ball 175 below its center. The legs 182 and 183 also tend to move toward the ball 175 and provide an additional bias to the hook portions 178 and 179 to lift the ball off the valve seat 174. After the ball has been initially disengaged from the valve seat, the reduction in the pressure sealing force and the increasing mechanical advantage as the ball is engaged farther below center cause the hook portions 178 and 179 to move quickly inward away from legs 182 and 183 and lift the ball 175 into cage 176. Thus the legs 182 and 183 bias the hook portions 178 and 179 only during the initial opening of the valve and otherwise do not change the operation of bimetal strip 177.

If desired, the bore 173 may be made smaller in diameter to reduce the size of valve seat 174, and by reducing the effective area of the valve seat and bore, the sealing force of the pressure within the chamber 171 may be reduced to lessen the force which the bimetal strips 177 and 180 must exert to open the valve.

Although several embodiments of the invention have been shown and described, it is understood that the invention is not limited to any particular form and that various modifications and rearrangements may be made as required by particular applications without departing from the scope of the invention as set forth in the following claims.

What is claimed is:

1. A thermostatic valve comprising a valve housing, said valve housing defining an interior chamber, said housing having an inlet to said chamber and an outlet at the lower end of said chamber, a valve seat on said housing adjacent said outlet, a cage within said chamber adjacent said valve seat, a ball within said cage normally adapted to seat against said valve seat to close said outlet passage, and a bimetal element supported on said cage, said bimetal element having a ball engaging portion adapted to contact said ball only at a distance substantially below the center thereof and shift said ball out of engagement with said valve seat when the temperature of said bimetal element falls below a predetermined temperature.

2. A thermostatic valve comprising a valve housing, said valve housing defining an interior chamber, said housing having an inlet to said chamber and an outlet at the lower end of said chamber, a valve seat on said housing adjacent said outlet, a cage within said housing chamber adjacent said valve seat, said cage having an interior chamber, a ball within said cage chamber for free movement in a vertical direction into and out of engagement with said valve seat, a bimetal member mounted on said cage, said bimetal member having a ball engaging portion at the lower end thereof adjacent said valve seat, said bimetal element being shiftable above a predetermined temperature to shift said ball engaging portion away from said valve seat to permit said ball to seat against said valve seat, said ball engaging portion below said predetermined temperature being shifted toward said ball and said valve seat to engage said ball only at a distance substantially below the center thereof and lift said ball upward out of engagement with said valve seat.

3. A thermostatic valve comprising a valve housing, said valve housing defining an interior chamber, said housing having an inlet to said chamber and an outlet at the lower end of said chamber, a valve seat on said housing adjacent said outlet, a cage within said chamber adjacent said valve seat, a ball within said cage normally adapted to seat against said valve seat to close said outlet passage, and a bimetal element mounted on said cage, said bimetal element having a ball engaging portion adapted to contact said ball only at a distance substantially below the center thereof and lift said ball vertically upward out of engagement with said valve seat when the temperature of said bimetal element falls below a predetermined temperature.

4. A thermostatic valve comprising a valve housing, said valve housing defining an interior chamber, said housing having an inlet to said chamber and an outlet at the lower end of said chamber, a valve seat on said housing adjacent said outlet, a cage within said housing chamber adjacent said valve seat, said cage having an interior chamber, a ball within said cage chamber for free movement in a vertical direction into and out of engagement with said valve seat, a bimetal member mounted on said cage, said bimetal member having a ball engaging portion at the lower end thereof adjacent said valve seat, said bimetal element being shiftable above a predetermined temperature to shift said ball engaging portion downwardly and radially away from said valve seat to permit said ball to seat against said valve seat, said ball engaging portion below said predetermined temperature being shifted upwardly and radially toward said ball and said valve seat to engage said ball only at a distance substantially below the center thereof and lift said ball upward out of engagement with said valve seat.

5. A thermostatic valve comprising a valve housing, said valve housing defining an interior chamber, said valve housing having an inlet to said chamber and an outlet at the lower end of said chamber, a valve seat on said housing adjacent said outlet, a cage within said chamber adjacent said valve seat, a ball within said cage adapted to seat against said valve seat to close said outlet passage, a bimetal element mounted on said cage, said bimetal element having a depending portion extending downward on each of an opposed pair of sides of said cage, each of said depending portions having a hook portion extending downwardly and inwardly toward said valve seat, said bimetal element being operable at a predetermined temperature to shift said hook portions away from said valve seat to allow said ball to engage said valve seat, said bimetal element being operable below said predetermined temperature to shift said hook portions toward each other to engage said ball only at points a substantial distance below the center thereof and lift said ball upwardly out of engagement with said valve seat.

6. A thermostatic valve comprising a valve housing, said valve housing defining an interior chamber, said valve housing having an inlet to said chamber and an outlet at the lower end of said chamber, a valve seat on said housing adjacent said outlet, a cage within said chamber adjacent said valve seat, a ball within said cage adapted to seat against said valve seat to close said outlet passage, a bimetal element supported on said cage, said bimetal element having a depending portion extending downward on each of an opposed pair of sides of said cage, each of said depending portions having a hook portion at the lower end thereof projecting downwardly and inwardly toward said valve seat, said bimetal element being flexible responsive to a predetermined temperature to shift said hook portions downwardly and outwardly to permit said ball to seat against said valve seat, said bimetal element being flexible below said predetermined temperature to shift said hook portions inwardly and upwardly to engage said ball only at a distance substantially below the center thereof and lift said ball vertically out of engagement with said valve seat and into said cage.

7. A thermostatic valve comprising a valve housing, said valve housing defining an interior chamber, said valve housing having an inlet to said chamber and an outlet at one end of said chamber, a valve seat on said housing adjacent said outlet, a cage within said chamber above said valve seat, a ball within said cage shiftable into and out of engagement with said valve seat, a pair of depending bimetal strips mounted on said cage and extending vertically downwardly on opposite sides of said ball, said bimetal strips having hook portions extending downwardly and inwardly from the lower ends thereof, said bimetal strips being flexible responsive to a predetermined temperature to shift said hook portions away from said ball to permit said ball to move into engagement with said valve seat, said bimetal strips being flexible below said predetermined temperature to shift said hook portions toward said ball to engage said ball only at points a substantial distance below the center thereof and lift said ball out of engagement with said valve seat and into said cage.

8. A thermostatic valve comprising a valve housing, said valve housing defining an interior chamber, said valve housing having an inlet to said chamber and an outlet at the lower end of said chamber, a valve seat on said housing adjacent said outlet, a cage within said chamber adjacent said valve seat, said cage having a retainer portion having upper surfaces sloping upwardly and inwardly and defining an apex angle therebetween, a ball within said cage shiftable vertically into and out of engagement with said valve seat, a bimetal strip mounted on said cage, said bimetal strip including top portions sloping upwardly and inwardly to define an apex angle therebetween, said strip top portions overlying said retainer top portions, said bimetal strip having depending portions extending downwardly on opposite sides of said cage, said bimetal strip having hook portions extending downwardly and inwardly from said depending portions, said bimetal strip being formed so that below a predetermined temperature said hook portions will support said ball within said cage with the apex angle between said strip top portions less than the apex angle between said retainer top portions, said bimetal strip being flexible above said temperature to shift said hook portions outwardly to permit said ball to move into engagement with said valve seat, shifting of said bimetal strip causing said strip top portions to flex outwardly to increase the apex angle therebetween whereby said bimetal strip is shifted downwardly as a unit as said hook portions move outwardly, said bimetal strip being flexible below said temperature to shift said hook portions inwardly to engage said ball only at points a substantial distance below the center thereof and lift said ball out of engagement with said valve seat.

9. A thermostatic valve comprising a valve housing, said valve housing defining an interior chamber, said valve housing having an inlet to said chamber and an outlet at one end of said chamber, a valve seat on said housing adjacent said outlet, a cage within said chamber above said valve seat, said cage having a chamber in the lower end thereof above said valve seat, a ball within said cage chamber above said valve seat, a pair of bimetal strips secured at their upper ends on opposed sides of said cage and extending downwardly toward said valve seat, each of said bimetal strips having a hook portion at the lower end thereof extending downwardly and inwardly toward said valve seat and across the lower end of said cage chamber, a ball within said cage chamber, said bimetal strips adapted to flex outwardly above a predetermined temperature to permit said ball to seat against said valve seat, said bimetal strips being adapted below said predetermined temperature to flex inwardly to cause said hook portions to engage said ball only at points a substantial distance below the center thereof to shift said ball away from said valve seat and into said cage chamber.

10. A thermostatic valve comprising a valve housing, said valve housing defining an interior chamber, said valve housing having an inlet to said chamber and an outlet at one end of said chamber, a valve seat on said housing adjacent said outlet, a cage within said chamber above said valve seat, said cage having a chamber in the lower end thereof above said valve seat, a ball within said cage chamber above said valve seat, a pair of bimetal strips secured at their upper ends on opposed sides of said cage and extending downwardly toward said valve seat, each of said bimetal strips having a hook portion at the lower end thereof extending downwardly and inwardly toward said valve seat and across the lower end of said cage chamber, a ball within said cage chamber, a spring within said cage chamber biasing said ball toward said valve seat, said bimetal strips adapted to flex outwardly above a predetermined temperature to permit said ball to seat against said valve seat, said bimetal strips being adapted below said predetermined temperature to flex inwardly to cause said hook portions to engage said ball only at points between the center thereof and said valve seat to shift said ball away from said valve seat and into said cage chamber.

11. A thermostatic valve comprising a valve housing, said valve housing defining an interior chamber, said valve housing having an inlet to said chamber and an outlet at one end of said chamber, a valve seat on said housing adjacent said outlet, a cage positioned within said chamber above said valve seat, said cage having a chamber in the lower end thereof adjacent said valve seat, a ball within said cage chamber shiftable into and out of engagement with said valve seat, a bimetal strip mounted on said cage, said bimetal strip being secured at the one end on one side of said cage adjacent the lower end thereof, said bimetal strip having a portion extending toward the top of said cage, said bimetal strip having a top portion extending across the top of said cage, said bimetal strip having a depending portion extending downward from said top portion along the opposite side of said cage, said bimetal strip having a hook portion on the lower end of said depending portion to extend downwardly and inwardly across said cage chamber, said bimetal strip being flexible to shift said hook portion responsive to changes in temperature radially outwardly to permit said ball to shift into engagement with said valve seat and radially inwardly to engage said ball only at a distance substantially below the center thereof and lift said ball out of engagement with said valve seat.

12. A thermostatic valve comprising a valve housing, said valve housing defining an interior chamber, said valve housing having an inlet to said chamber and an outlet at one end of said chamber, a valve seat on said housing adjacent said outlet, a cage positioned within said chamber above said valve seat, said cage having a chamber in the lower end thereof adjacent said valve seat, a ball within said cage chamber shiftable into and out of engagement with said valve seat, a spring within said cage chamber biasing said ball toward said valve seat, a bimetal strip mounted on said cage, said bimetal strip being secured at the one end on one side of said cage adjacent the lower end thereof, said bimetal strip having a portion extending toward the top of said cage, said bimetal strip having a top portion extending across the top of said cage, said bimetal strip having a depending portion extending downward from said top portion along the opposite side of said cage, said bimetal strip having a hook portion on the lower end of said depending portion to extend downwardly and inwardly across said cage chamber, said bimetal strip being flexible to shift said hook portion responsive to changes in temperature radially outwardly to permit said ball to shift into engagement with said valve seat and radially inwardly to engage said ball only at a distance substantially below the center thereof and lift said ball out of engagement with said valve seat.

13. A thermostatic valve comprising a valve housing, said valve housing having walls defining an interior chamber, said valve housing having an inlet to said chamber on the side wall thereof, said valve housing having an outlet at the lower end of said chamber, a valve seat on said housing adjacent said outlet, a cage within said chamber positioned above said valve seat, said cage including a pair of vertically aligned plates extending transversely across said inlet at spaced distances therefrom, a retainer interconnecting said cage plates, said cage plates and said retainer defining chamber within said cage, a ball within said cage chamber adapted for shiftable movement into and out of engagement with said valve seat, and a bimetal strip supported on said retainer, said bimetal strip having a depending portion on each of opposed sides of said retainer and extending toward said valve seat, each of said depending portions having a ball engaging portion whereby above a predetermined temperature said bimetal strip flexes to shift said ball engaging portions away from said valve seat to permit said ball to shift into sealing engagement with said valve seat, said bimetal strip being flexible below said temperature to shift said ball engaging portions into contact with said ball only at a distance substantially below the center thereof to shift said ball out of engagement with said valve seat.

14. A thermostatic valve comprising a valve housing, said valve housing having walls defining an interior chamber, said valve housing having an inlet to said chamber on the side wall thereof, said valve housing having an outlet at the lower end of said chamber, a valve seat on said housing adjacent said outlet, a cage within said chamber positioned above said valve seat, said cage including a pair of vertically aligned plates extending transversely across said inlet at spaced distances therefrom, a retainer interconnecting said cage plates, a plurality of vertical ribs on said side walls adapted to position said cage within said chamber, said cage plates and said retainer defining a chamber within said cage, a ball within said cage chamber adapted for shiftable movement into and out of engagement with said valve seat, and a bimetal strip supported on said retainer, said bimetal strip having a depending portion on each of opposed sides of said retainer and extending toward said valve seat, each of said depending portions having a ball engaging portion whereby above a predetermined temperature said bimetal strip flexes to shift said ball engaging portions radially away from said valve seat to permit said ball to shift into sealing engagement with said valve seat, said bimetal strip being flexible below said temperature to shift said ball engaging portions toward each other and into contact with said ball only at a distance substantially below the center thereof to shift said ball out of engagement with said valve seat.

15. A thermostatic valve comprising a valve housing, said valve housing defining an interior chamber, said housing having an inlet to said chamber and an outlet at the lower end of said chamber, a valve seat on said housing adjacent said outlet, a cage within said chamber adjacent said valve seat, a ball within said cage normally adapted to seat against said valve seat to close said outlet passage, a first bimetal element supported on said cage, said first bimetal element having a ball engaging portion adapted to contact said ball only at a distance substantially below the center thereof and shift said ball out of engagement with said valve seat when the temperature of said first bimetal element falls below a predetermined temperature, and a second bimetal element supported on said cage and adapted to bias said ball engaging portion into contact with said ball below said predetermined temperature.

16. A thermostatic valve comprising a valve housing, said valve housing defining an interior chamber, said valve housing having an inlet to said chamber and an outlet at the lower end of said chamber, a valve seat on said housing adjacent said outlet, a cage within said chamber adjacent said valve seat, a ball within said cage adapted to seat against said valve seat to close said outlet passage, a first bimetal element mounted on said cage, said first bimetal element having a depending portion extending downward on each of an opposed pair of sides of said cage, each of said depending portions having a hook portion extending downwardly and inwardly toward said valve seat, said first bimetal element being operable at a predetermined temperature to shift said hook portions away from said valve seat to allow said ball to engage said valve seat, said first bimetal element being operable below said predetermined temperature to shift said hook portions toward each other to engage said ball only at a distance substantially below the center thereof and lift said ball upwardly out of engagement with said valve seat, and a second bimetal element mounted on said cage, said second bimetal element having a depending portion extending adjacent each depending portion of said first bimetal element and adapted to bias said hook portions into engagement with said ball at said lower temperature.

References Cited in the file of this patent
UNITED STATES PATENTS

| | | |
|---|---|---|
| 1,478,028 | Decker | Dec. 18, 1923 |
| 2,027,458 | Te Pas | Jan. 14, 1936 |
| 2,518,653 | Ziganek | Aug. 15, 1950 |